United States Patent [19]

Bobo

[11] 3,842,858

[45] Oct. 22, 1974

[54] GAS VALVE
[76] Inventor: Frank E. Bobo, 212 Algee St., Tiptonville, Tenn. 38079
[22] Filed: Dec. 12, 1973
[21] Appl. No.: 424,157

[52] U.S. Cl.................... 137/458, 137/461, 137/462
[51] Int. Cl............................................. F16k 17/24
[58] Field of Search ........... 137/458, 461, 462, 463, 137/464

[56] References Cited
UNITED STATES PATENTS

| | | | |
|---|---|---|---|
| 2,266,642 | 12/1941 | Karrer............................ | 137/464 X |
| 2,584,900 | 2/1952 | Mefford.............................. | 137/463 |
| 2,701,580 | 2/1955 | Sullivan.............................. | 137/458 |
| 3,384,110 | 5/1968 | Wiley.................................. | 137/458 |
| 3,422,841 | 1/1969 | Farrer................................ | 137/461 |

Primary Examiner—Harold W. Weakley
Attorney, Agent, or Firm—John R. Walker, III

[57] ABSTRACT

A valve for shutting off the flow of gas in a pressurized gas line when the pressure in the gas line suddenly increases or decreases a substantial amount. A flexible diaphragm activates plunger means to cause the flow of gas through the gas valve to be blocked when the pressure in the gas line suddenly decreases a substantial amount. Likewise, the flexible diaphragm activates bracket means to cause the flow of gas through the gas valve to be blocked when the pressure in the gas line suddenly increases a substantial amount.

10 Claims, 2 Drawing Figures

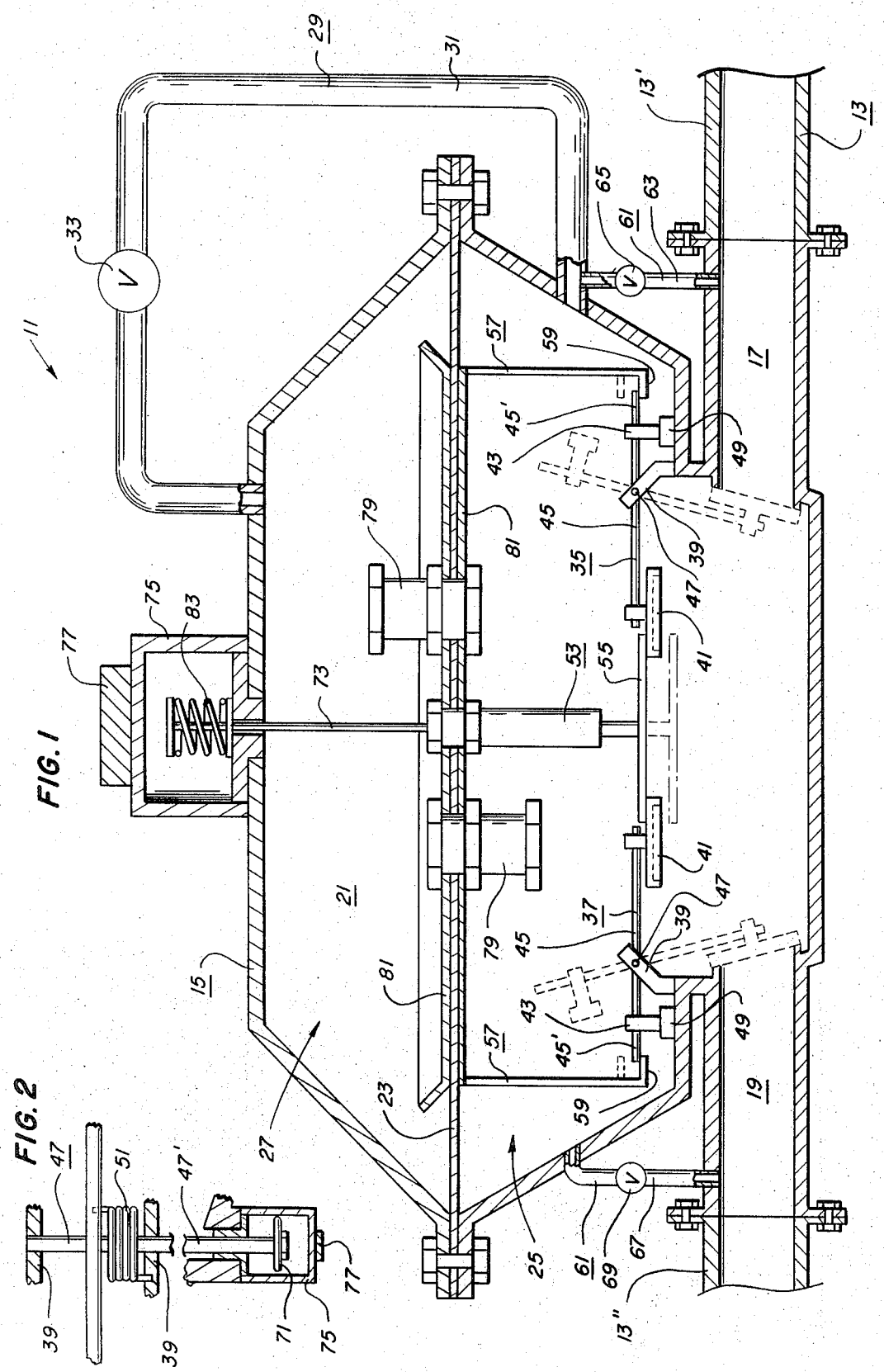

GAS VALVE

BACKGROUND OF THE INVENTION

1. Field of the Invention

This invention relates generally to valves and more specifically to gas valves for shutting off the flow of gas in pressurized gas lines.

2. Description of the Prior Art

The following U.S. patents are known to relate generally to the present invention: Stout, U.S. Pat. No. 1,911,590; Brown, U.S. Pat. No. 2,543,566; Mefford et al., U.S. Pat. No. 2,584,900; and Neenan, U.S. Pat. No. 3,602,250. None of the above patents disclose or suggest the present invention.

Stout discloses a gas valve in which atmospheric pressure causes a flexible diaphragm to close the valve upon a drop in the pressure in the gas line below a predetermined degree. Brown discloses a relatively complex gas valve adapted to close automatically in the event of a rupture in the gas line. Mefford discloses a valve for automatically stopping the flow of fluid from a supply source in the event that there is a break in the conducting system downstream from the valve, thereby preventing any loss of fluid. Neenan discloses a fluid shut off valve that may be attached to an ordinary lawn hose for controlling the flow of water into a swimming pool.

SUMMARY OF THE INVENTION

The present invention is directed towards overcoming the problems and disadvantages in previous valves for use in pressurized gas lines. The concept of the present invention is to provide a valve for closing a pressurized gas line when there is a sudden change in pressure of a substantial amount in the gas line.

The valve of the present invention stays open when there is a slow pressure change in the gas line and closes only when there is a sudden pressure change of a substantial amount. In general, the valve of the present invention includes a hollow body, a flexible diaphragm mounted in the hollow body, flap means mounted in the hollow body for movement between opened and closed positions to control the flow of gas through the valve, and activating means mounted on the diaphragm for causing the flap means to move from the opened to the closed position to prevent the flow of gas through the valve.

BRIEF DESCRIPTION OF THE DRAWINGS

FIG. 1 is a sectional view of the gas valve of the present invention attached to a pressurized gas line.

FIG. 2 is a sectional view of a portion of the gas valve of the present invention showing manual means for reopening the gas valve after it has been closed by a sudden pressure change of a substantial amount.

DESCRIPTION OF THE PREFERRED EMBODIMENT

The valve 11 of the present invention is adapted to shut off the flow of gas in a pressurized gas line 13 when there is a sudden change in pressure of a substantial amount in the gas line 13. More specifically, the valve 11 is adapted to close the gas line 13 when there is a sudden drop in pressure in the gas line 13 due to the gas line 13 being ruptured, cut, or the like. In addition, the valve 11 may be adapted to close the gas line 13 when there is a sudden rise in pressure in the gas line 13 due to a faulty gas regulator or the like.

The valve 11 includes a body 15 for amounting intermediate the gas line 13. The body 15 includes a first passageway 17 attached to a first end 13' of the gas line 13 by means well known to those skilled in the art and includes a second passageway 19 attached to a second end 13" of the gas line 13 by means well known to those skilled in the art. The body 15 also includes an internal cavity 21 which coacts with the first and second passageways 17, 19 to allow gas to flow from the gas line 13 through the valve 11.

A flexible diaphragm 23 is mounted in the internal cavity 21 of the body 15 for dividing the internal cavity 21 into first and second portions 25, 27.

The valve 11 is provided with a first equalization means 29 located between the first and second portions 25, 27 of the internal cavity 21 for allowing restricted equalization of slow pressure change between the first and second portions 25, 27 of the internal cavity 21. More specifically, the first equalization means 29 includes a hollow conduit 31 leading from the first portion 25 of the internal cavity 21 to the second portion 27 thereof and includes a restrictive valve 33 mounted in the hollow conduit 31 for restricting the flow of gas between the first and second portions 25, 27 of the internal cavity 21 through the hollow conduit 31. The restrictive valve 33 may consist of any type of adjustable valve well known to those skilled in the art or may consist simply of a restricted orifice which limits the flow of gas therethrough.

First and second flap means 35, 37 are included in the valve 11 and are mounted in the first portion 25 of the internal cavity 21 of the body 15 by means of ears 39 for movement between first positions away from the first and second passageways 17, 19 to allow gas to flow through the valve 11 (as shown in solid lines in FIG. 1) and second positions adjacent the first and second passageways 17, 19 to prevent gas from flowing through the valve 11 (as shown in phantom lines in FIG. 1). Each flap means 35, 37 includes a seal member 41 for blocking off the first and second passageways 17, 19 when the flap means 35, 37 are in the second positions, holding members 43 for normally holding the flap means 35, 37 in the first positions, and arm means 45 movably mounted to the ears 39 through pivots 47 and connecting the seal members 41 and holding members 43 together. The holding members 43 preferably include magnetic portions 49 for coacting with the walls of the body 15 for substantially holding the flap means 35, 37 in the first positions. A spring 51 may be provided between the arms 45 of the flap means 35, 37 and the ears 39 to urge the flap means 35, 37 towards the second positions when the magnetic hold between the holding members 43 and the walls of the body 15 is broken. However, it should be noted that normally the flap means 35, 37 are moved from the first positions to the second positions by the force of gravity after the magnetic hold between the holding members 43 and the walls of the body 15 is broken.

The valve 11 is provided with activating means mounted on the diaphragm 23 for causing the first and second flap means 35, 37 to move from the first positions to the second positions when the pressure in the first portion 25 of the internal cavity 21 suddenly changes a substantial amount causing the diaphragm 23 to dilate. The activating means includes a plunger member 53 attached to the diaphragm 23 for causing the first and second flap means 35, 37 to move from the first positions to the second positions when the pressure in the first portion 25 of the internal cavity 21 suddenly drops a substantial amount causing the diaphragm 23 to extend into the first portion 25 of the internal cavity 21. More specifically, the plunger member 53 includes a head portion 55 that contacts the first and second flap means 35, 37 when the diaphragm 23 extends into the first portion 25 of the internal cavity 21 causing the magnetic hold between the first and second flap means 35, 37 and the walls of the body 15 to be broken, thus, allowing the first and second flap means 35, 37 to move to the second positions blocking the flow of gas through the valve 11. The activating means may also include bracket members 57 attached to the diaphragm 23 for causing the first and second flap means 35, 37 to move from the first positions to the second positions when the pressure in the first portion 25 of the internal cavity 21 suddenly increases a substantial amount causing the diaphragm 23 to extend into the second portion 27 of the internal cavity 21. More specifically, the bracket members 57 include lift portions 59 which coact with extended portions 45' of the arms 45 of the first and second flap means 35, 37 to break the magnetic hold between the holding members 43 of the first and second flap means 35, 37 and the walls of the body 15 when the diaphragm 23 extends into the second portion 27 of the internal cavity 21 to allow the first and second flap means 35, 37 to move to the second positions.

The valve 11 preferably includes second equalization means 61 for allowing selective equalization of pressure between the first and second ends 13', 13'' of the gas line 13 and the internal cavity 21 when the first and second flap means 35, 37 are in the second positions preventing the flow of gas through the valve 11 to allow the first and second flap means 35, 37 to be subsequently moved to the first positions for allowing the flow of gas through the valve 11. That is, to move the first and second flap means 35, 37 from the second positions to the first positions the pressure in the gas line 13 and the internal cavity 21 must be equal or the diaphragm 23 will dilate causing the activating means to cause the first and second flap means 35, 37 to move back to the second positions. More specifically, the second equalization means 61 includes a first hollow conduit 63 between the first passageway 17 and the first portion 25 of the internal cavity 21 and includes a first manual valve 65 mounted in the first hollow conduit 63 for allowing selective equalization of pressure between the first passageway 17 and the internal cavity 21 when the first flap means 35 is in the second position. In addition, the second equalization means 61 includes a second hollow conduit 67 between the second passageway 19 and the first portion 25 of the internal cavity 21 and includes a second manual valve 69 mounted in the second hollow conduit 67 for allowing selective equalization of pressure between the second passageway 19 and the internal cavity 21 when the second flap means 37 is in the second position.

The valve 11 is provided with manual means to move the first and second flap means 35, 37 to the first positions from the second positions. Preferably, the manual means for moving the first and second flap means 35, 37 to the first positions from the second positions consists of handles 71 mounted on extended portions 47' of the pivots 47 which mount the first and second flap means 35, 37 to the ears 39 of the body 15.

The valve 11 preferably includes means for manually causing the first and second flap means 35, 37 to move from the first positions to the second positions. More specifically, a stem 73 is preferably attached to the diaphragm 23 and extends through the wall of the body 15. It should be noted that the stem 73 may be activated either by hand or remotely by means of an electric solenoid or the like to cause the diaphragm 23 to dilate and thereby force the activating means to cause the first and second flap means 35, 37 to close.

Preferably, all the mechanical parts of the valve 11 are enclosed so that the valve 11 may be used under water or the like without harmful effects to the mechanical parts. More specifically, caps 75 are provided on the valve 11 over the external portions of the pivots 47 and stem 73. The caps 75 are screwably mounted to the body 15 of the valve 11 by wellknown means to those skilled in the art. Preferably, the caps 75 are provided with nutlike portions 77 to aid in screwing the caps 75 onto and off of the body 15.

The diaphragm 23 is preferably provided with safety valves 79 to relieve pressure between the first and second portions 25, 27 of the internal cavity 21 when there is an extreme pressure change in the gas line 13 thereby putting the diaphragm 23 in danger of being ruptured.

The valve 11 includes washer-like portions 81 mounted on the diaphragm 23 in a manner well known to those skilled in the art. The plunger member 53, bracket members 57, stem 73 and safety valves 79 are suspended from the washer-like portions 81 and act on the diaphragm 23 through the washer-like portions 81. A counter balance spring 83 is preferably provided to counter balance the weight of safety valves 79 and washer-like portions 81.

It should be noted that the valve 11 is sealed by typical means such as gaskets or the like, well known to those skilled in the art to make the valve 11 fluid tight.

The operation of the valve 11 of the present invention is quite simple. When the first and second flap means 35, 37 are in the first positions away from the first and second passageways 17, 19, the first equalization means 29 will allow a slow pressure increase or decrease in the gas line 13 to be equalized between the first and second portions 25, 27 of the internal cavity 21 so as not to cause movement of the flexible diaphragm 23. However, upon a sudden change in the pressure in the gas line 13, the flexible diaphragm 23 will dilate and cause movement of either the plunger member 53 or the bracket members 57 thereby breaking the magnetic hold between the first and second flap means 35, 37 and the walls of the body 15 thereby causing the first and second flap means 35, 37 to move from the first poritions to the second positions thereby blocking the flow of gas through the gas line 13. More specifically, upon a sudden decrease in pressure in the gas line 13 the flexible diaphragm 23 will be extended into the first portion 25 of the internal cavity 21 since sufficient equalization will not take place through the first equalization means 29 thereby causing the plunger 53 to cause the first and second flap means 35, 37 to move from the first positions to the second positions. On the other hand, upon a sudden increase in pressure in the gas line 13, the flexible diaphragm 23 will be extended into the second portion 27 of the internal cavity 21 since sufficient equalization will not take place through the first equalization means 29 thereby causing the bracket members 57 to cause the first and second flap means 35, 37 to move from the first positions to the second positions. In addition, the flexible diaphragm 23 may be moved manually by the stem 73 to cause either the plunger 53 or the bracket members 57 to cause the first and second flap means 35, 37 to move from the first positions to the second positions. It should be noted that either the plunger 53 or the bracket portions 57 may be omitted causing the valve 11 to operate only upon either a pressure increase or a pressure decrease. In order to move the first and second flap means 35, 37 back to the first positions from the second positions after the valve 11 has been closed, the first and second manual valves 65, 59 of the second equalization means 61 are manually opened, allowing equalization between the gas line 13 and the internal cavity 21. After the pressure is equalized between the gas line 13 and the internal cavity 21, the first and second flap means 35, 37 are manually moved to the first positions by means of the handle 71 on the extended portion 47' of the pivots 47 or the like.

As thus constructed and operated, the valve 11 provides a fail proof shut off valve that operates when gas flow is in either direction to shut off the flow of gas through the gas line 13 when there is a sudden change in the pressure in the line 13 of a substantial amount regardless of the pressure range. The sensitivity of the valve 11 can be changed by adjusting the restrictive valve 33 of the first equalization means 29. The valve 11 is completely enclosed and does not require atmospheric pressure to operate. It can be manually controlled either at the valve 11 or remote therefrom. The valve 11 can be adapted to operate in any position by adding stronger magnetic portions 49 and springs 51.

Although the invention has been described and illustrated with respect to a preferred embodiment thereof, it is not to be so limited since changes and modifications may be made therein which are within the full intended scope of the invention.

I claim:

1. A valve means for closing a pressurized gas line when there is a sudden change in pressure of a substantial amount in the gas line, said valve means comprising:
    a. body means for mounting intermediate the gas line, said body means having first and second passageways and an internal cavity for allowing gas to pass therethrough;
    b. flexible diaphragm means mounted in said internal cavity of said body means for dividing said internal cavity into first and second portions;
    c. first equalization means located between said first and second portions of said internal cavity for allowing restricted equalization of slow pressure change between said first and second portions of said internal cavity;
    d. first and second flap means mounted in said first portion of said internal cavity for movement between first positions away from said first and second passageways to allow gas to flow through said valve means and second positions adjacent said first and second passageways to prevent gas from flowing through said valve means;
    e. activating means mounted on said disphragm means for causing said first and second flap means to move from said first positions to said second positions when the pressure in said first portion of said internal cavity suddenly changes a substantial amount causing said diaphragm to dilate.

2. The valve means of claim 1 in which said activating means includes plunger means attached to said diaphragm means for causing said first and second flap means to move from said first positions to said second positions when the pressure in said first portion of said internal cavity suddenly drops a substantial amount causing said diaphragm means to extend into said first portion of said internal cavity.

3. The valve of claim 1 in which said activating means includes bracket means attached to said diaphragm means for causing said first and second flap means to move from said first positions to said second positions when the pressure in said first portion of said internal cavity suddenly increases a substantial amount causing said diaphragm means to extend into said second portion of said internal cavity.

4. The valve means of claim 1 in which said first and second flap means include magnetic means for coacting with said body means to substantially hold said first and second flap means in said first positions.

5. The valve means of claim 4 in which said first and second flap means include spring means for urging said first and second flap means toward said second positions when the magnetic hold between said magnetic means of said first and second flap means and said body means is broken.

6. The valve means of claim 1 in which said first equalization means includes adjustable valve means for selectively adjusting the equalization of pressure change between said first and second portions of said internal cavity.

7. The valve means of claim 6 in which is included second equalization means located between said first and second passageways and said internal cavity for allowing selective equalization of pressure between the gas line and said internal cavity when said first and second flap means are in said second positions preventing the flow of gas through said valve means to allow said first and second flap means to be subsequently moved to said first positions for allowing the flow of gas through said valve means.

8. The valve means of claim 7 in which said second equalization means includes manual valve means for selectively allowing the equalization of pressure between the gas line and said internal cavity.

9. A valve means for closing a pressurized gas line when there is a sudden change in pressure of a substantial amount in the gas line, said valve means comprising:
    a. body means for mounting intermediate the gas line, said body means having first and second passageways for mounting to the gas line and having an internal cavity for allowing gas to pass therethrough;
    b. flexible diaphragm means mounted in said internal cavity of said body means for dividing said internal cavity into first and second portions;
    c. first equalization means located between said first and second portions of said internal cavity for allowing restricted equalization of slow pressure change between said first and second portions of said internal cavity;

d. first and second flap means mounted in said first portion of said internal cavity for movement between first positions away from said first and second passageways to allow gas to flow through said cut-off valve means and second positions adjacent said first and second passageways to prevent gas from flowing through said valve means;

e. plunger means attached to said diaphragm means for causing said first and second flap means to move from said first position to said second position when the pressure in said first portion of said internal cavity drops a substantial amount causing said diaphragm means to extend into said first portion of said internal cavity; and f. bracket means attached to said diaphragm means for causing said first and second flap means to move from the first positions to the second positions when the pressure in said first portion of said internal cavity suddenly increases a substantial amount causing said diaphragm means to extend into said second portion of said internal cavity.

10. The valve means of claim 9 in which is included second equalization means located between said first and second passageways and said internal cavity for allowing selective equalization of pressure between the gas line and said internal cavity when said first and second flap means are in said second position preventing the flow of gas through said valve means to allow said first and second flap means to be subsequently moved to said first positions for allowing the flow of gas through said valve means.

* * * * *